United States Patent [19]

Anderson

[11] 4,177,559
[45] Dec. 11, 1979

[54] INTERNAL PIPE CUTTER

[75] Inventor: Charles E. Anderson, Minneapolis, Minn.

[73] Assignee: Cherne Industries, Inc., Edina, Minn.

[21] Appl. No.: 881,064

[22] Filed: Feb. 24, 1978

[51] Int. Cl.² .............................................. B23D 21/06
[52] U.S. Cl. ........................................ 30/105; 30/320; 30/357
[58] Field of Search ...................... 30/105, 103, 164.9, 30/357, 320

[56] References Cited

U.S. PATENT DOCUMENTS

| | | | |
|---|---|---|---|
| 378,203 | 2/1888 | Lohman | 30/357 |
| 767,036 | 8/1904 | Borchers | 30/105 |
| 996,310 | 6/1911 | Casagrande | 30/105 |
| 1,443,799 | 1/1923 | Maupin | 30/105 |
| 1,496,928 | 6/1924 | Evers | 30/320 |
| 2,051,199 | 8/1936 | Christianson | 30/320 |
| 2,145,985 | 2/1939 | Krajicek | 30/320 |
| 2,597,258 | 5/1952 | Papp | 30/320 |
| 3,911,574 | 10/1975 | Jones | 30/105 |
| 3,999,292 | 12/1976 | Breese | 30/105 |

FOREIGN PATENT DOCUMENTS 112154 12/1925 Switzerland ............................... 30/320

Primary Examiner—Othell M. Simpson
Assistant Examiner—J. T. Zatarga
Attorney, Agent, or Firm—Merchant, Gould, Smith, Edell, Welter & Schmidt

[57] ABSTRACT

An internal pipe cutter comprises a rotatable mandrel having a cutting drum and a guide drum mounted thereon. The guide drum is longitudinally adjustable relative to the cutting drum and controls the depth at which the cutting drum is received inside the pipe. The cutting drum includes a slidably mounted cutter which is projected outwardly into engagement with the pipe by centrifugal force. The cutter comprises a slider block having a radially adjustable cutting blade. In addition, one surface of the cutting drum has an access slot which communicates with the slider block enclosed inside the drum. The access slot allows a tool to be inserted into the cutting drum as necessary to unjam the cutter without having to dismantle the cutting drum.

8 Claims, 4 Drawing Figures

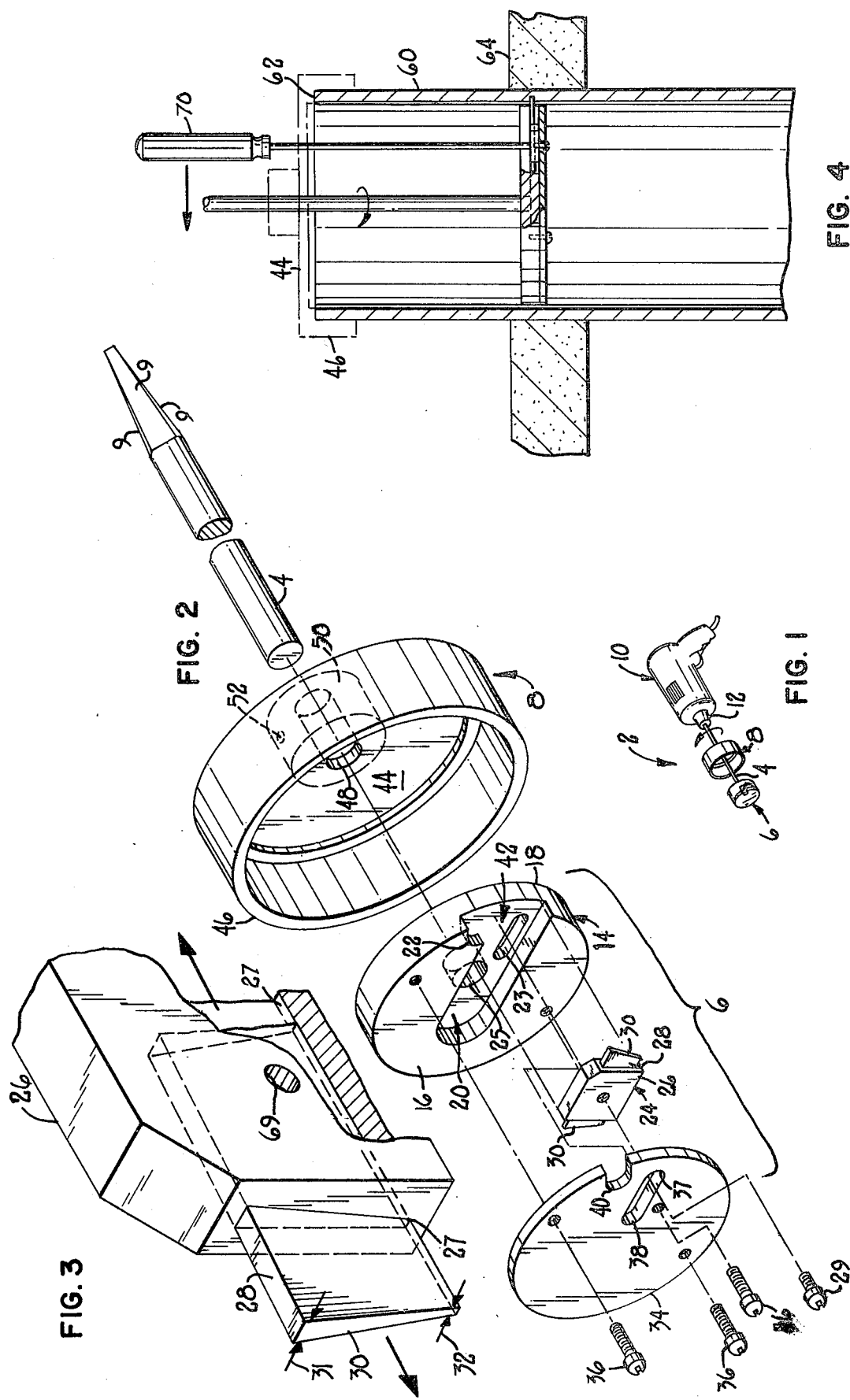

INTERNAL PIPE CUTTER

BACKGROUND OF THE INVENTION

1. Field of the Invention

The present invention relates generally to devices for cutting pipe or other cylindrical conduits. More particularly, the present invention relates to an internal pipe cutter (i.e., one which operates in the interior of the pipe) for cutting PVC pipe.

2. Description of the Prior Art

It has become quite common in the construction of both residential and commercial buildings to use polyvinyl chloride (PVC) pipe for the waste drains of the bathroom fixtures, such as the toilet, the shower, and/or the bathtub. Generally, these waste pipes are installed or roughed in before the floor of the bathroom is constructed. Thus, it is usually impossible when the pipes are first installed to accurately measure the length of pipe needed. Consequently, the pipes must later be cut to the proper length after the floor is installed; usually, it is required that this cut be at or below the level of the floor to allow proper installation of the bathroom fixtures. This "below grade" cutting presents certain problems since the pipe obviously cannot be cut by a saw or other tool which is operable on the external surface of the pipe.

A number of prior art devices, generically known as internal pipe cutters, have been proposed for cutting PVC pipe as well as other types of pipe from the interior thereof. However, these prior art pipe cutters all exhibit various disadvantages. For example, U.S. Pat. No. 3,999,292 to Breese discloses an internal pipe cutter having a cutting drum which slidably mounts a cutting bit therein. The cutting bit is urged outwardly into engagement with the pipe by a plurality of springs contained in a recess in the cutting drum. However, as the springs force the cutting bit outwardly, they simultaneously force the remainder of the cutting drum rearwardly into engagement with that portion of the pipe opposite to the portion contacted by the cutting bit. When these springs are strong, the cutting drum may be engaged with the pipe with a great deal of force. Thus, as the cutting drum is rotated to cut the pipe, the friction between the drum and the pipe gradually heats the pipe. In some instances, this frictional heat is so great that it can melt or deform the pipe. This requires that the damaged pipe be removed and replaced which is a laborious and time consuming procedure.

Other internal pipe cutters are known which do not utilize springs for forcing a cutting bit outwardly. For example, U.S. Pat. No. 3,911,574 to Jones discloses the use of centrifugal force to throw the cutting bit radially outwardly. U.S. Pat. No. 3,883,950 to Kurtz discloses the use of a movable wedge to cam the cutter bits outwardly into engagement with the pipe. In this latter type of cutter, springs are often used to keep the cutter bits normally retracted until forced outwardly by the wedge.

In those devices which utilize a movable wedge or cam (e.g., Kurtz), the wedge must be actuated to move the cutting bits outwardly before the cutter can be rotated to cut the pipe. In addition, when cutting relatively thick pipe, the cutter may have to be stopped a number of times to readjust the cutter bits to maintain contact with the pipe. With regard to the centrifugally operated cutter shown in Jones, although the rotating movement of the pipe cutter moves the cutter bits radially outwardly, these bits are not enclosed in any type of guide drum. Therefore, in some instances, the bits might be susceptible to jamming by the pipe fragments broken off of the pipe by the cutter bits.

Finally, most prior art internal pipe cutters are difficult to remove if they become jammed inside the pipe without actually physically breaking the floor and pipe apart to remove the cutter or trying to dismantle the cutter from outside the pipe. For example, in cutters which disclose the cutting bit as being enclosed inside a cutting drum, no provision is usally made for easily disengaging the cutter bit if it should become jammed. When the cutting bit of an internal pipe cutter becomes jammed, it has been the usual practice to break away the floor surrounding the pipe to free the cutter. Such an operation requires that a new section of the pipe be installed and that the floor be rebuilt around the pipe as necessary. The extra expense and labor entailed by this procedure is apparent.

SUMMARY OF THE INVENTION

It is an aspect of the present invention to provide an internal pipe cutter in which a cutting surface is radially adjustable relative to a cutting drum. In addition, it is another aspect of the present invention to provide an internal pipe cutter having means for providing easy access to the cutter to allow it to be moved radially inwardly to unjam the cutter without removing or damaging any portion of the pipe in which the cutter is received.

Accordingly, an internal pipe cutter according to the present invention comprises a rotatable mandrel having a guide drum and a cutting drum carried thereon. The guide drum and the cutting drum are adjustably mounted relative to each other such that the longitudinal distance therebetween can be varied. This allows the operator to change the depth at which the cutting drum is maintained inside the pipe by the guide drum. The cutting drum includes a cutter comprising a slider block which is projectable outwardly by the centrifugal force of rotation of the mandrel. The slider block has a slot for adjustably mounting a cutting blade. The position of the cutting blade relative to the slider block can be adjusted by a set screw to control the maximum projection of the cutting surface from the cutting drum. In addition, the cutting drum has an access slot in one surface thereof which communicates with a recess in which the cutter is slidably received. Thus, if the cutter should become jammed while cutting a pipe, the guide drum is first removed from the upper end of the mandrel, and then a tool may be inserted through the access slot to reach the cutter to radially force the cutter inwardly to unjam the cutter.

BRIEF DESCRIPTION OF THE DRAWINGS

The present invention will be described hereafter in the Detailed Description, when taken in conjunction with the following drawings, wherein like reference numerals will refer to like elements throughout.

FIG. 1 is a perspective view of the internal pipe cutter of the present invention including a power means for rotating the cutter;

FIG. 2 is a perspective view of the internal pipe cutter as shown in FIG. 1, with the parts thereof being shown in exploded form;

FIG. 3 is a perspective view of the cutter bit of the internal pipe cutter of FIG. 1; and FIG. 4 is an elevational view of the internal pipe cutter of FIG. 1 showing the cutter in operation in cutting a pipe.

DETAILED DESCRIPTION

Referring first to FIG. 1, an internal pipe cutter or cutting apparatus according to the present invention is generally indicated as 2. Pipe cutter 2 comprises a longitudinally elongated mandrel or shaft 4 having a cutting disc or drum 6 mounted at one end. Although it is preferred that mandrel 4 be cylindrical since this is a common and readily obtainable shape, mandrel 4 may also have other shapes if so desired. Mandrel 4 also carries a guide drum 8 which is longitudinally spaced along the mandrel a suitable distance from cutting drum 6.

The end of mandrel 4 which is opposite to the cutting drum 6 may be connected to any suitable power means for rotating the mandrel. As shown in FIG. 1, a preferred power means is an electric hand-held drill 10 (e.g., a ⅜" or ¼" drill) having a chuck 12 into which the end of mandrel 4 is inserted. In this regard, the end of mandrel 4 may have a reduced portion which is provided with a plurality of flats 9 (FIG. 2) or the like which are matingly received inside chuck 12. Drill 10 is able to rotate mandrel 4 and cutting drum 6 at a sufficiently high speed to cut polyvinyl chloride (PVC) pipe as will be described in more detail hereafter. In addition, cutting drum 6 is also able to cut through other plastic or non-metallic pipe or conduits. Furthermore, if drill 10 is sufficiently powerful and cutting drum 6 is made of sufficiently durable materials, then cutting drum 6 in some instances may be used to cut through thin-walled metallic pipe.

Referring now to FIG. 2, cutting drum 6 comprises a cylindrical drum body 14. Drum body 14 has first and second opposed planar surfaces 16 and 18 which may be respectively referred to as front and rear surfaces. Front surface 16 has a radially extending elongated recess or channel 20 which accomodates and supports a cutter 24 for cutting the pipe. The outer end of channel 20 is widened as at 22 to form an escape passage for pipe fragments. In addition, the rear surface 18 of drum body 14 has an elongated access slot 23 therein which communicates with at least a portion of channel 20. Furthermore, a circular hole 25 is provided at the midpoint of drum body 14 in the rear surface 18 thereof. One end of mandrel 4 is inserted into hole 25 and mandrel 4 is suitably welded to rear surface 18 of the drum body. Thus, cutting drum 6 is fixedly connected to mandrel 4 for concurrent rotation therewith. Although welding is a preferred form of attachment between drum body 14 and mandrel 4, any other suitable connection could be used (e.g., a screw threaded connection).

A cutter or cutter bit 24 is slidably mounted in channel 20 of drum body 14. Cutter 24 comprises a weighted member 26 (e.g., a slider block) which closely fits in and conforms to the configuration of channel 20. Slider block 26 has an elongated slot 27 passing through the center thereof. Slot 27 slidably receives a cutting blade 28 in a relatively close fit with no appreciable wobble in blade 28. The radial position of cutting blade 28 relative to slider block 26 is adjustably fixed by a set screw 29. Set screw 29 passes through slider block 26 and lockingly bears against one side of the cutting blade 28. As shown in FIGS. 2 and 3, cutting blade 28 is reversible having two identical cutting surfaces 30 formed on either end thereof. Each cutting surface 30 is tapered in thickness having a larger thickness 31 at the cutting leading edge of blade 28 and a smaller thickness 32 at the trailing edge of blade 28. Blade 28 is made from any appropriate material such as case-hardened steel.

Cutter 24 is placed inside channel 20 and is held therein by means of a detachable cover plate 34. Cover plate 34 is held or otherwise releasably secured to the drum body 14 by a plurality (e.g., two) of circumferentially spaced tap screws 36. Cover plate 34 has an opening 40 on its periphery which corresponds generally to the widened portion 22 of channel 20 in drum body 14. Opening 40 will communicate or co-act with widened portion 22 when the cover plate 34 is assembled to the drum body to form an escape passageway for chips or fragments of the pipe which are cut or broken off of the pipe by the cutter 24. Cover plate 34 almost completely encloses cutter 24. However, an opening 42 (i.e., the outer end of channel 20) is formed between cover plate 34 and the drum body 14 when they are assembled together to allow the cutting blade 28 to project outwardly therefrom for the purpose of cutting the pipe as will be described hereafter. In addition, cover plate 34 has an elongated slot 38 through which set screw 29 extends. The engagement of set screw 29 with the outer end 37 of slot 38 will serve as a stop or limit for the outward movement of the weighted cutter 24.

Guide drum 8 comprises a radially extending flange 44. Flange 44 has a diameter which is equal to or slightly greater than the diameter of the pipe to be cut. Thus, the end of the pipe abuts against flange 44. Flange 44 also has a downwardly extending tubular wall 46 integrally formed with or connected to its periphery. Tubular wall 46 defines a shell or chamber larger in diameter than the pipe and which receives therein the upper end of the pipe to be cut. A circular hole 48 is provided at the midpoint of flange 44. Hole 48 loosely receives mandrel 4 such that guide drum 8 is nonrotatably journaled on mandrel 4. In other words, even though mandrel 4 rotates, guide drum 8 will not rotate. Furthermore, the longitudinal position of guide drum 8 along mandrel 4 is fixed by a cylindrical collar 50 which abuts against flange 44. Collar 50 is adjustably fixed along mandrel 4 by means of a releasable set screw 52. Collar 50 has a plurality of bearings (e.g., ball bearings, not shown) or other bushing surfaces for rotatably journaling mandrel 4 therein. In addition, the surface of collar 50 which abuts against guide drum 8 may also have a low friction thrust or bearing surface (e.g., a Teflon insert or the like, not shown).

Referring now to FIG. 4, the internal pipe cutter 2 of the present invention is particularly adapted for scoring or severing polyviny chloride pipe (as well as other non-metallic pipe), such as that used in the waste drains for toilets, showers, bathtubs, and other bathroom fixtures. For example, in a typical method of constructing a building, a PVC pipe, generally indicated as 60, is usually installed such that it protrudes upwardly through the final grade of the building floor, which is often a poured concrete floor 64 or the like. It is then necessary to cut the PVC pipe 60 off at or below the grade of floor 64 in order to properly install the appropriate fixtures. In this regard, collar 50 is positioned appropriately along the mandrel 4 so that a suitable distance is provided between guide drum 8 and cutting drum 6. Calibrated indicia (not shown) may be placed along the outer surface of mandrel 4 to assist in positioning collar 50 and guide drum 8. After the drums 6 and 8 have been so positioned, pipe cutter 2 is inserted into the pipe as shown in FIG. 4 with cutting drum 6 extending downwardly into the pipe to a proper depth. Guide drum 8 will then have flange 44 abutting against the upper end 62 of pipe 60 to maintain cutting drum 6 at this depth. The tubular wall 46 of guide drum 8 extends downwardly for a short distance along and in close proximity to the exterior surface of pipe 60. The entire pipe cutter 2 will thus be supported on pipe 60 by guide drum 8.

After the internal pipe cutter 2 is installed in the above-noted manner, electric drill 10 is suitably connected to the opposite end of mandrel 4. When drill 10 is operated (e.g., by an AC power source) to rotate mandrel 4, cutting drum 6 is also rotated. Centrifugal force will act on the slider block 26 causing cutter 24 to be projected outwardly through the opening 42 until cutting blade 28 engages the interior surface of pipe 60. In this regard, the weight of slider block 26 is chosen such that the centrifugal force will be sufficient to always project the cutter bit 24 outwardly with sufficient force to engage and cut pipe 60.

As cutting drum 6 is rotated, cutting blade 28 in engagement with the pipe will sever or cut through the wall of the pipe 60. In this regard, the thickness 31 of the leading cutting edge of blade 28 will make contact with the pipe 60 but the reduced thickness 32 of the trailing cutting edge of the blade will not. In other words, the trailing edge of blade 28 will ride or follow in the groove made by the leading cutting edge. Thus, blade 28 will not tend to stick or jam in the cut or unduly frictionally heat the pipe because of the tapered thickness in the cutting surface 30. In addition, each cutting surface 30 could also be radially tapered between the leading cutting edge and the trailing edge in a manner which approximates the angular arc of the pipe surface if so desired.

The radial adjustability of cutter blade 28 relative to slider block 26 is an important feature of the present invention. The outward radial movement of slider block 26 is limited by the engagement of set screw 29 with the outer end 37 of slot 38. However, even though slider block 26 is limited in its radial movement, the maximum projection of cutting blade 28 from cutting drum 6 can be set by adjusting cutting blade 28 in the slot 27. Thus, cutting blade 28 can be set at a sufficient distance to completely cut through the pipe or, alternatively, to only score the pipe rather than completely cut through it.

A set screw 56 extends through cover plate 34 and lockingly bears against the sides of slider block 26. One purpose of set screw 56 is to allow cutter blade 28 to be easily adjusted relative to slider block 26 even when the slider block is received inside channel 20 and covered by cover plate 34. In this regard, set screw 56 fixes or locks the position of slider block 26 in channel 20 and prevents it from freely sliding therein as the operator attempts to manipulate set screw 29 to adjust cutter blade 28. In addition, cutter 24 may be moved inside channel 20 to a completely retracted position inside the cutting drum 6 so that cutter blade 28 does not project through opening 42. Set screw 56 can then be used to lock cutter 24 in its retracted position for safety purposes (e.g., cutter 24 will not be thrown outwardly by centrifugal force if the electric drill 10 should become accidentially engaged).

The removable nature of blade 28 provides for easy replacement or repair of the blade. For example, when one cutting surface 30 of blade 28 becomes worn, all that must be done is to remove the cover plate 34, remove cutter 24 from channel 20, slide cutting blade 28 out of slot 27, reverse the blade to position the other cutting surface 30 in a working position, and then reassemble these components. If both cutting surfaces 30 are worn, these surfaces 30 may be resharpened after cutter 24 is removed from cutting drum 6. After blade 28 is reground and resharpened, it is then reinserted into the slider block 26. Suitable adjustment is then made in set screw 29 such that the newly sharpened cutting surface 30 will be positioned in a proper cutting position.

Another important feature of the present invention is access slot 23. If the cutter 24 should for some reason become jammed as it cuts the pipe, access slot 23 allows the cutter to be easily cleared or loosened. To do so both the collar 50 and the guide drum 8 are first removed from the mandrel 4 (e.g., by lifting them off the mandrel). The operator can then insert a suitable tool, such as a screwdriver 70, through the pipe, through the access slot 23, and into engagement with the slider block 26. In this regard, slider block 26 has an opening 69 into which the tip of screwdriver 70 is inserted. Screwdriver 70 enables the operator to force the slider block radially inwardly as he simultaneously grips the mandrel 4 to hold the cutter 2 and prevent it from dropping down the pipe 60. This inward movement in slider block 26 unjams the cutting blade 28 from the pipe without having to dismantle the cutting drum 6 or break the concrete floor 64 out around the cutter 2. This is a considerable savings of time and effort and enables cutter 24 to be easily unjammed.

Various modifications will be apparent to those skilled in the art. For example, more than one channel 20 and cutter 24 can be utilized in cutting drum 6 if so desired. Furthermore, both cutting drum 6 and guide drum 8 could be provided in different diameters to cut standard sized pipes having different diameters (e.g., pipes having 2, 3 or 4 inch diameters). In this regard, a single guide drum 8 having a plurality of annular steps corresponding to the different pipe diameters could be used. Thus, the scope of the present invention is to be limited only by the appended claims.

What is claimed is:

1. An internal pipe cutter for cutting a pipe having a predetermined thickness, which comprises:
    (a) a rotatable mandrel;
    (b) a cutting drum and guide drum carried on the mandrel and adjustably mounted relative to one another such that the longitudinal spacing therebetween can be varied;
    (c) the guide drum having means for controlling the depth at which the cutting drum is positioned in the pipe; and
    (d) the cutting drum having a cutter which is projected radially outwardly by centrifugal force as the mandrel is rotated to cut the pipe, wherein the cutter comprises a slider block slidably received in the cutting drum and carrying a cutting blade therein, the cutting blade being radially adjustable relative to the slider block, wherein the slider block has a slot which loosely receives the cutting blade therein and a set screw which bears against the cutting blade to hold the cutting blade in an adjusted radial position relative to the slider block; and wherein the cutting drum has an elongated radial slot through which the set screw extends, the outward movement of the slider block being limited by engagement of the set screw with a radially outer end of the cutting drum slot, wherein the outer end of the cutting blade slot is positioned relative to the screw and the cutting blade is positioned relative to the slider block such that the cutting blade cuts through the predetermined thickness of the pipe substantially simulataneously with the engagment of the set screw with the outer end of the cutting drum slot to prevent the cutter from being projected outwardly past the pipe after the pipe has been cut.

2. An internal pipe cutter which comprises:
(a) a rotatable mandrel;
(b) a cutting drum and guide drum carried on the mandrel and adjustable mounted relative to one another such that the longitudinal spacing therebetween can be varied;
(c) the guide drum having flange means for abutting an end portion of the pipe to control the depth at which the cutting drum is positioned in the pipe after insertion of the cutting drum through an open end of the pipe; and
(d) the cutting drum having a cutter which is slidably mounted therein to be projected radially outwardly as the mandrel is rotated to cut the pipe, the cutter normally being substantially enclosed in the cutting drum except for a cutting surface which is projectable through an opening in the periphery of the cutting drum, and the cutting drum further having an access slot for allowing access to the cutter enclosed inside the cutting drum, wherein the access slot is open in the same direction as the mandrel extends from the cutting drum and wherein the cutter includes means suited for gripping a tool which tool may be placed generally parallel to the mandrel, whereby the cutter may be radially moved inwardly when the cutting drum is received in the pipe to unjam the cutter by inserting the tool through the access slot into the tool gripping means on the cutter and moving the tool radially inwardly.

3. An internal pipe cutter as recited in claim 2, further including a power means connected to the mandrel for rotating the mandrel.

4. An internal pipe cutter as recited in claim 2, in which the cutting drum has a radially arranged channel in which the cutter is slidably received, and wherein one exterior surface of the cutting drum has the access slot which slot communicates with the radial channel.

5. An internal pipe cutter as recited in claim 4, wherein the cutter comprises a slider block slidably received in the channel in the cutting drum and having a cutting blade mounted therein, the cutting blade containing the cutting surface and being radially adjustable relative to the slider block to control the maximum projection of the cutting surface relative to the cutting drum.

6. An internal pipe cutter, which comprises:
(a) a rotatable mandrel;
(b) a cutting drum fixed to the mandrel for concurrent rotation therewith, the cutting drum having a cutter which is projected radially outwardly as the mandrel is rotated to cut the pipe, wherein the cutter comprises a slider block slidably received in a channel in the cutting drum and substantially completely enclosed therein, the slider block carrying a cutting blade therein which has a cutting surface that is projectable through an opening in the periphery of the cutting drum to cut the pipe, the cutting blade being radially adjustable relative to the slider block to control the maximum projection of the cutting surface relative to the cutting drum, and wherein the cutting drum further has opposed faces with the cutter being located adjacent one face and an access slot being located in the other face thereof, the access slot being in operative communication with the cutting drum channel, wherein the access slot is open in the same direction as the mandrel extends from the cutting drum and wherein the slider block includes means suited for gripping a tool which tool may be placed generally parallel to the mandrel whereby the tool may be inserted through the access slot into the interior of the cutting drum and joined to the tool gripping means to move the cutter radially inwardly if it should become jammed;
(c) a guide drum nonrotatably journaled around the mandrel and being longitudinally adjustable along the mandrel to vary the distance between the cutting drum and the guide drum, the guide drum having an annular flange for abutting against an end of the pipe to control the depth at which the cutting drum is positioned in the pipe; and
(d) a power means connectable to one end of the mandrel for rotating the mandrel such that the cutter cuts the pipe.

7. An internal pipe cutter as recited in claim 6, further comprising selectively actuable means for locking the slider block in the cutting drum channel.

8. An internal pipe cutter as recited in claim 6, in which the tool gripping means comprises a hole in the slider block which hole is shaped to receive one end of the tool therein.

* * * * *